Dec. 5, 1950          C. H. EARHART          2,533,099
PHOTOGRAPHIC CAMERA
Filed Dec. 19, 1947          5 Sheets-Sheet 1
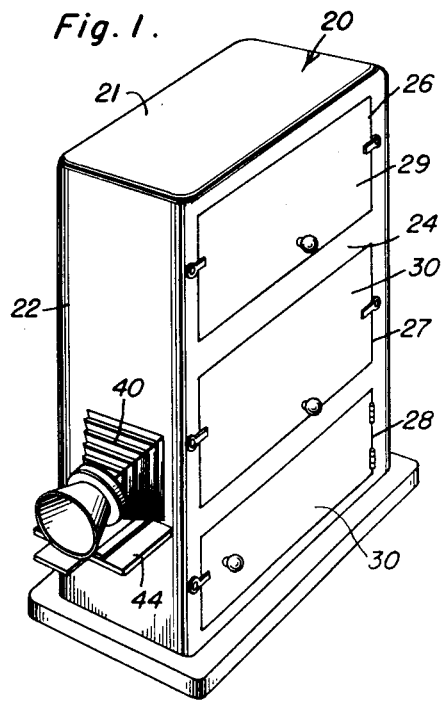
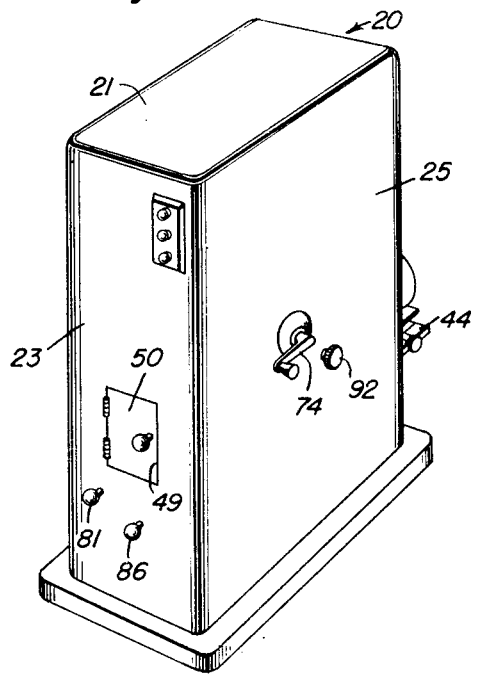
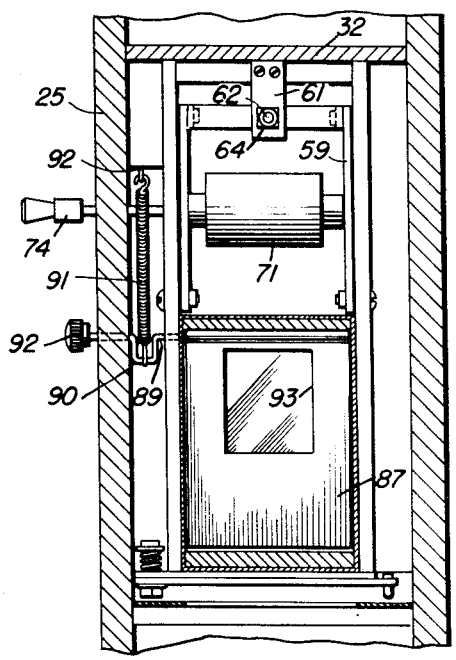
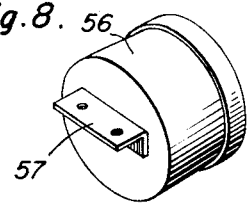
Inventor
Charles H. Earhart
By *Clarence A. O'Brien and Harvey B. Jacobson*
Attorneys Dec. 5, 1950     C. H. EARHART     2,533,099
PHOTOGRAPHIC CAMERA
Filed Dec. 19, 1947     5 Sheets-Sheet 2
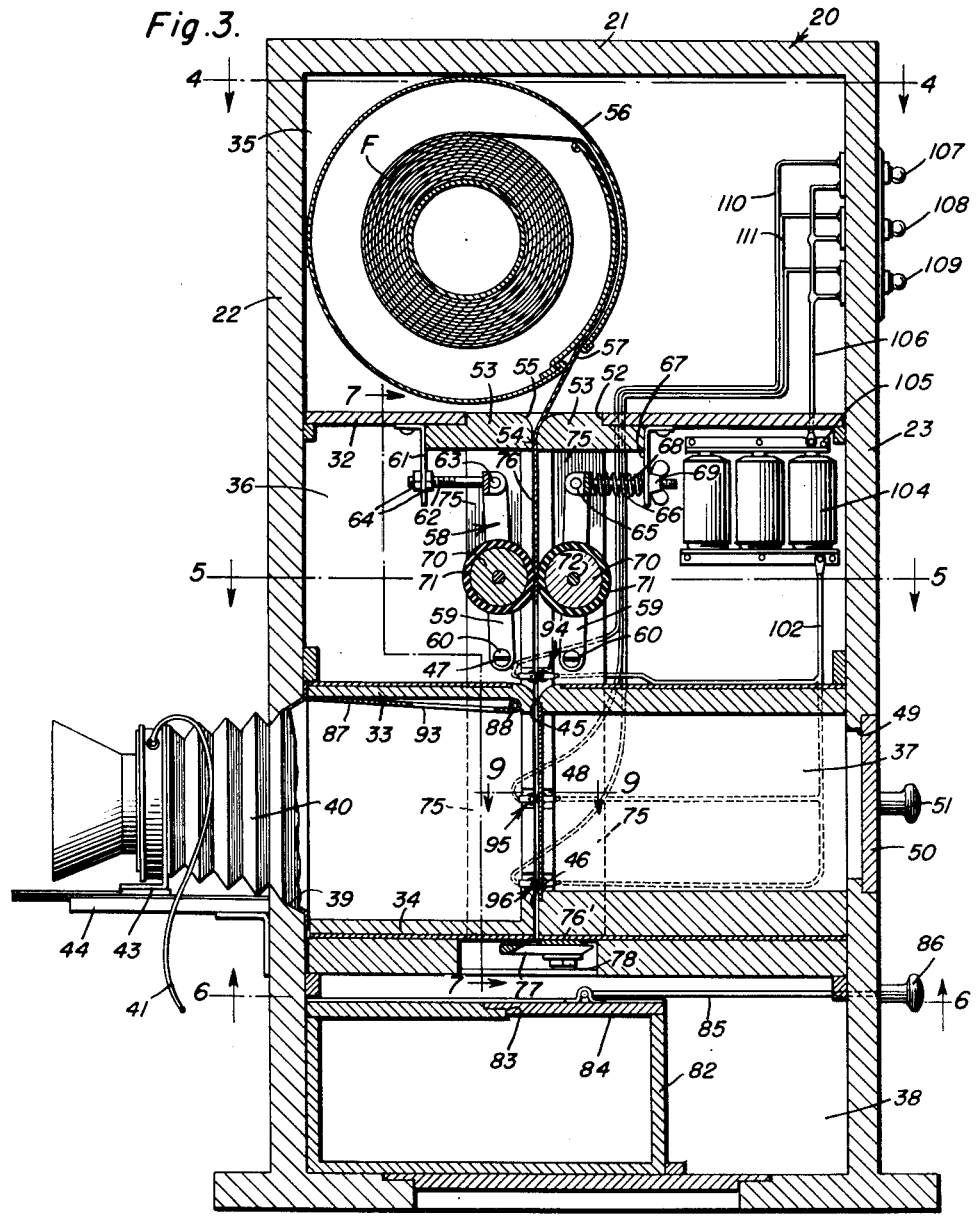
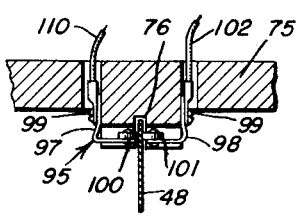
Inventor
Charles H. Earhart
By Clarence A. O'Brien
and Harvey B. Jacobson
Attorneys

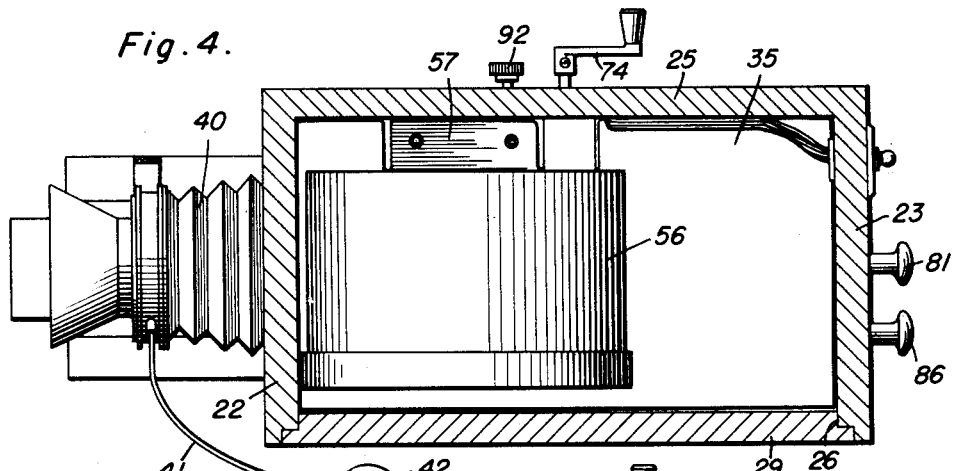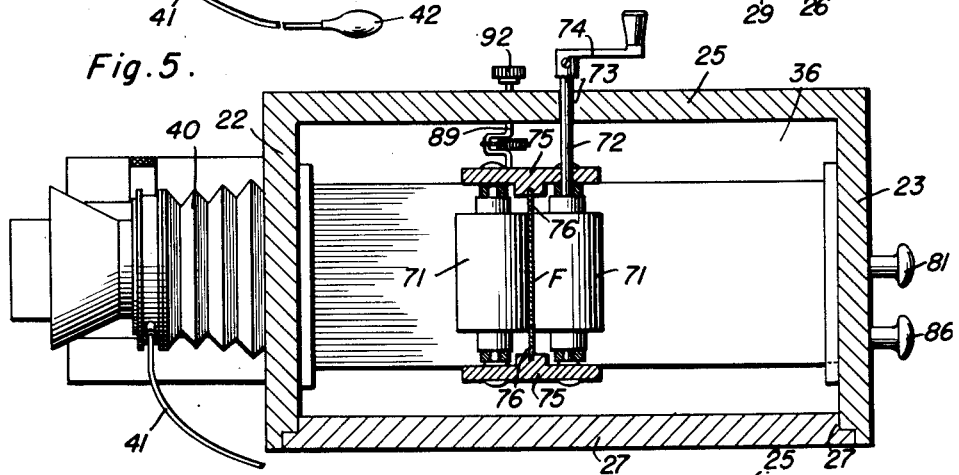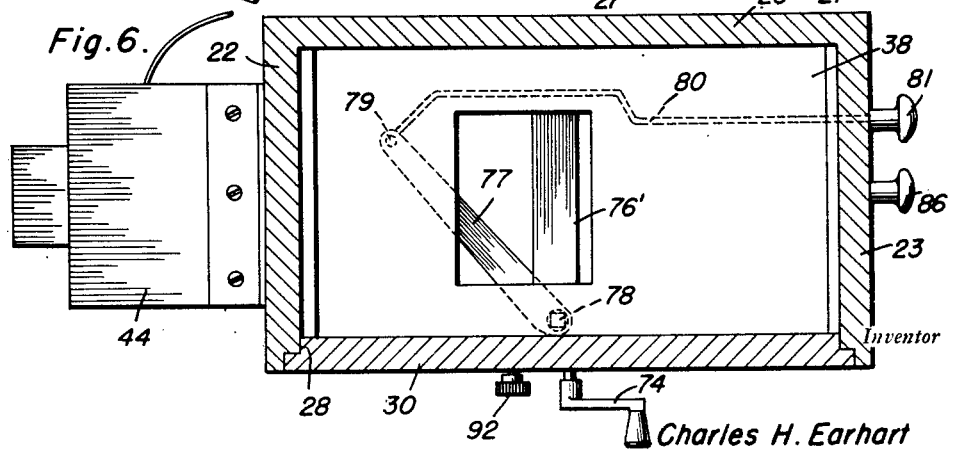

Dec. 5, 1950 C. H. EARHART 2,533,099
PHOTOGRAPHIC CAMERA
Filed Dec. 19, 1947 5 Sheets-Sheet 4

Inventor
Charles H. Earhart
By Clarence A. O'Brien
and Harvey B. Jacobson
Attorneys Dec. 5, 1950   C. H. EARHART   2,533,099
PHOTOGRAPHIC CAMERA Filed Dec. 19, 1947   5 Sheets-Sheet 5

Inventor

Charles H. Earhart

By Clarence A. O'Brien
and Harvey B. Jacobson
Attorneys

Patented Dec. 5, 1950

2,533,099

UNITED STATES PATENT OFFICE 2,533,099

PHOTOGRAPHIC CAMERA

Charles H. Earhart, Danville, Ill., assignor of one-fourth to Donald L. Gebhart, Danville, Ill.

Application December 19, 1947, Serial No. 792,685

6 Claims. (Cl. 95—31)

This invention relates to a photographic camera and more particularly to photographic and developing apparatus.

The primary object of this invention is to produce direct positive pictures of clear and distinct quality.

Cameras for producing direct positive pictures on paper film are widely used throughout the country in instances where the subject does not wish to consume the time required for the ordinary processes of producing pictures involving first the taking of the impression on a negative and subsequently developing the negative and making prints thereof, all of which is time consuming and requires that the customer make at least two trips to the studio, first for the taking of the picture and second for the receiving of the prints thereof. With the taking of the direct positive picture and the subsequent development and fixing thereof, a subject or customer need wait but a few minutes in order to complete the transaction. A major defect occurring with the use of cameras employed for taking direct positive photographs however resides in the fact that such cameras provide no means for focusing on the subject and consequently unless the subject remains at an exact distance from the camera, the resulting photograph is quite likely to be of poor quality and the detail blurred.

Another object of this invention is to facilitate the production of sharp, clear and distinct photographs by the direct positive method and to save time for the customer and for the camera operator.

A further and more specific object is to enable the camera to be focused upon the subject prior to the exposure of the film to the light.

The above and other objects may be attained by employing this invention which embodies among its features a focusing screen, means movable relative to said screen for exposing film to light, means for moving said exposing means to properly focus the subject on the screen, means for advancing film to be exposed to light over the surface of the screen adjacent the film exposing means, and means actuated by the movement of the film over the face of the screen to indicate the position of the film relative to the screen.

Other features include a film magazine supported above the screen, means to extract film which is to be exposed to light from said magazine and to advance it over the face of the screen adjacent the film exposing means, means below the opening screen to sever the exposed film from the unexposed film, and means below the severing means to receive the exposed film as it is severed from the unexposed film.

Still other features include developing, washing and fixing trays below the focusing screen into which the exposed film may be introduced by the photographer for final finishing.

In the drawings:

Figure 1 is a perspective view of a direct positive camera including the details of this invention;

Figure 2 is a view similar to Figure 1 showing the opposite side of the camera;

Figure 3 is a vertical sectional view on an enlarged scale through a camera embodying the features of this invention;

Figure 4 is a horizontal sectional view taken substantially along the line 4—4 of Figure 3;

Figure 5 is a horizontal sectional view taken substantially along the line 5—5 of Figure 3;

Figure 6 is a horizontal sectional view taken substantially along the line 6—6 of Figure 3;

Figure 7 is a vertical sectional view taken substantially along the line 7—7 of Figure 3, and illustrating the mask in lowered position;

Figure 8 is a perspective view on a reduced scale of the film containing magazine, employed when the camera is equipped to use roll film;

Figure 9 is an enlarged sectional view taken substantially along the line 9—9 of Figure 3 illustrating one pair of contacts in detail;

Figure 10:
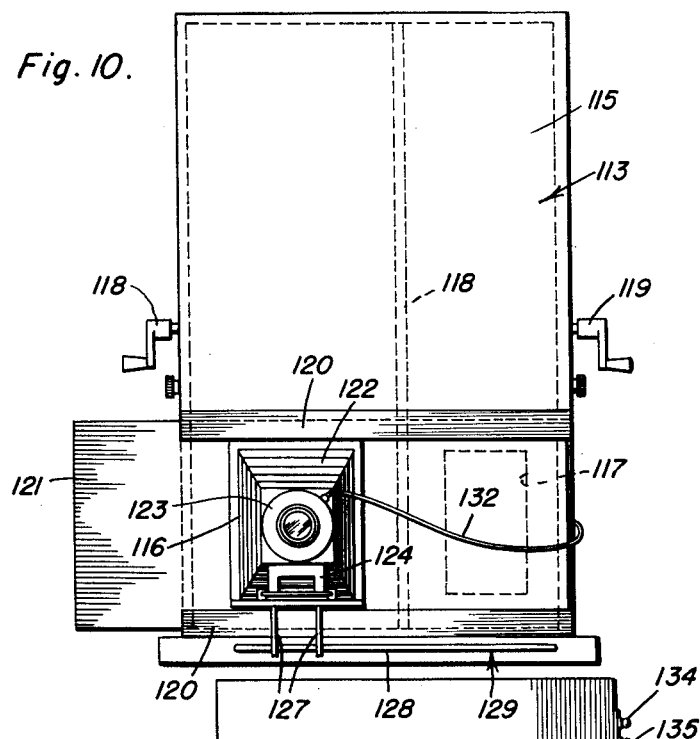
Figure 10 is a front view in elevation of a modified form of the camera embodying this invention.

Referring to the drawings in detail this improved camera comprises a case designated generally 20 having a closed top 21, a front wall 22, a back wall 23, a side wall 24 and an opposite side wall 25. The side wall 24 is provided with vertically spaced relatively large openings 26, 27 and 28 which are closed respectively by light-tight doors 29, 30 and 31. Horizontal partitions 32, 33, and 34 separate the case into a magazine chamber 35, a film feeding chamber 36, an exposure chamber 37, and a developing and mixing chamber 38. Removal of the door 29 gives access to the magazine chamber 35, removal of the door 30 gives access to the film feeding chamber 36 and the exposure chamber 37, and removal of the door 31 gives access to the developing chamber 38. Formed in the front wall 22 and opening into the exposure chamber 37 is a light admitting opening 39 in which one end of a conventional camera bellows 40 is secured to form a light-tight joint. The opposite end of the bellows 40 carries a conventional shutter opening and closing device controlled by a conventional tube and bulb 41 and 42 which may be of any preferred form, and mounted behind the shutter in the bellows 40 is a conventional objective lens. The forward end of the bellows carries a suitable angle bracket 43 mounted for longitudinal sliding movement on a bracket 44 which is fixed to the front wall 22 and projects forwardly therefrom so that the objective lens and the shutter may be moved toward or away from the camera in a conventional manner. Formed in the horizontal partition wall 33 between the front wall 22 and the side wall 23 of the casing 20 is a transversely extending slot 45 which aligns vertically with a transversely extending slot 46 formed in the horizontal partition wall 34. The upper adjacent edges of the slot 45 are curved as at 47 to form the substantially funnel-shaped guide through which the end of a strip of film enters the slot 45.

Extending between the horizontal partition walls 33 and 34 adjacent the rear walls of the slots 45 and 46 is a focusing screen 48 of ground glass or any other suitable material. Formed in the back wall 23 in alignment with the opening 39 in the front wall 22 is a window opening 49 which is adapted to be closed by a suitable door 50 in such a manner as to form a light-tight joint. This door is equipped with a knob 51 by which it may be removed in order that the focusing screen 48 may be viewed through the rear side of the camera. It will thus be seen that when no film extends through the slots 45 and 46, and the shutter at the forward end of the bellows 40 is opened, the image of the subject will appear on the focusing screen 48 and may be seen by removing the door 50 and looking through the opening 49. In this way the photographer may bring the subject into sharp focus on the screen by advancing or retracting the end of the bellows 40 remote from the case 20.

Formed in the wall 32 separating the magazine chamber 35 of the feed chamber 36 in axial alignment with the slot 45 in the wall 33 is a relatively large opening 52 in which a pair of film screen guide blocks 53 is fixed in such a manner as to form a guide slot 54 which aligns with the slot in the wall 33. The adjacent upper edges of the slot 54 are curved upwardly as at 55 to form a funnel-like guide through which the film leaving the magazine enters the slot 54 on its way to the exposure chamber 37. A magazine 56 is mounted on a suitable bracket 57 supported adjacent the side wall 25 in the magazine chamber 35 and contains a roll of film F, the outer end of which is led outwardly through a slot 47 in the magazine 56 and then downwardly through the slot 54 to enter the chamber 36.

In order to feed the film F through the chamber 36 and into the exposure chamber 37 a suitable film advancing and retracting means designated generally 58 is employed. This film advancing and retracting means comprises a pair of frames 59 which are pivotally supported adjacent their lower ends as at 60 on opposite sides of the slot 45 within the chamber 36. Mounted on the underside of the wall 32 adjacent the side of the opening 52 nearest the front wall 22 is an angle bracket 61, having a depending leg which is pierced to receive one end of an adjustable link 62, the opposite end of which is pivoted as at 63 to the upper end of the frame 59 adjacent the front wall 22 of the case 20. The end of the link member 62 remote from the pivot 63 is externally screw threaded to receive clamp nuts 64 which are adapted to engage opposite sides of the angle bracket 61 in order to hold the frame 59 in various adjusted positions relative to the axis of the slots 45 and 54. Pivotally coupled as at 65 to the upper end of the frame 59 adjacent the rear wall 23 is a link 66 the opposite end of which is screw threaded and extends through an opening formed in a depending leg of an angle bracket 67 which is fixed to the underside of the horizontal partition 32 on the side of the opening 52 nearest the rear wall 23 of the case 20. A compression coil spring 68 surrounds the link 65 between the bracket 67 and the frame 59, and the pressure exerted by said spring on the frame 59 is governed by a wing nut 69 which is threaded on the end of the link 66 remote from the pivoted end 65 thereof. It will thus be seen that the frame 59 nearest the rear wall 23 will be yieldingly urged toward the frame 59 nearest the front wall 22 of the case 20. A suitable roll 70 is mounted in each frame 59 intermediate its upper and lower ends, and these rolls are provided with friction faces 71 for contact with opposite sides of a film which is being fed from the magazine 56. As illustrated these rolls 70 rotate about parallel axes and by turning the nuts 64 the adjacent faces of the rolls 70 may be brought into proper position between the slots 54 and 45. Also by turning the wing nut 69 the effort of the spring 68 may be decreased or increased, and hence the pressure of the roll 70 governed thereby against the face of the film may be regulated. The shaft 72 of the rolls 70 nearest the rear wall 23 of the case 20 is extended laterally through an opening 73 in the side 25 of the case 20, and carries at its outer end a hand crank 74 by which the roll 70 carried by the shaft 72 may be rotated. It will be understood of course that the opening 73 in wall 25 is packed in any suitable manner to prevent light from entering the case 20 around the shaft 72. Extending between the walls 32 and 33, and the walls 33 and 34 adjacent opposite ends of the rolls 70 are spaced parallel vertical guides 75 each of which is provided with a vertical guide slot 76 for the reception of opposite side edges of the strip of film F as will be readily understood upon reference to Figure 5.

Fixed to the underside of the horizontal partition wall 34 within the developing and mixing chamber 38 is a fixed ledger blade 76', the cutting edge of which is disposed along one side edge of the slot 46. A movable blade 77 is pivoted as at 78 adjacent one end of the ledger blade 76, and pivotally connected as at 79 to the end of the blade 77 remote from the pivot 78 is a pull rod 80 which extends through the back wall 23 of the case 20 and is provided with an actuating knob 81, so that when pull is exerted on the knob 81, the movable blade 77 will move across the ledger blade 76 to sever an exposed portion of the film F from an unexposed portion thereof.

Contained within the chamber 36 is a suitable box 82 having an access opening 83 which aligns with the slot 46 in the partition wall 34 and is equipped with a sliding cover 84 to which is coupled one end of a pull rod 85, the opposite end of which projects through the back wall 23 of a case 20 and is equipped with a knob 86 by means of which the cover 84 may be moved into opening and closing position with relation to the access opening 83. It will thus be seen that as the movable knife 77 severs an exposed portion of the film from the unexposed portion, the exposed portion of the film may be deposited within the box 82 without exposure to light other than through the lens at the forward end of the bellows 46. At the convenience of the operator, the cover 84 may be moved to closed position over the access opening 83 and the box 82 with its contents may be transferred to a dark room where the contents of the box may be removed for processing.

In order that exposures of different sizes may be made, a rock shaft 88 is rotatably supported adjacent the upper edge of the screen 48 on the side adjacent the front wall 22. The mask 87 is fixed to said rock shaft 88, one end of which extends through a light-proof opening in the side wall 25. Formed on the shaft 89 between the mask 87 and the side wall 25 is a crank arm 90 to which one end of a retractile coil spring 91 is coupled. The opposite end of the spring 91 is coupled to an eye 92 fixed to the case 20 in such a position that when the mask 87 is in its raised or lowered position, the spring 91 will be under tension, and hence will serve to hold the mask against accidental movement. A suitable control knob 92 is fixed to the outer end of shaft 89 so that the position of the mask 87 may be manually controlled. The mask 87 is formed with a window 93 which occupies substantially the upper half of the mask as will be readily understood upon reference to Figure 7.

In order that the position of the film over the face of the screen 48 may be determined without opening the door 50 I provide three sets of contacts designated respectively 94, 95 and 96. The rollers 94 are located within the chamber 36 directly above the mouth 47 of the slot 45 and are arranged to engage opposite sides of a film which is being advanced into the slot 45 through a rotation of the rollers 70. The contact rollers 95 are mounted on one of the guides 75 midway between the upper and lower ends of the screen 48 while the contact rollers 96 are mounted adjacent the horizontal partition wall 34 at the mouth of the slot 46. Each set of contact rollers comprises spring arms 97 and 98 attached as by screws 99 to the guide 75 adjacent opposite sides of the groove 76 which extends therethrough. A contact roller 100 is rotably supported on the arm 97 and a similar contact roller 101 is rotatably supported on the arm 98, and these arms 97 and 98 are so tensioned as to urge the rollers 100 and 101 into contact with one another. To the arm 98 of each set of contacts 94, 95 and 96 is electrically connected one terminal of an electrical conductor 102 which leads to a supporting bracket 103 mounted on the wall 25 within the chamber 36. The supporting bracket 103 serves as a support as well as an electrical contact for dry cells 104, the opposite terminals of which are engaged by a conducting bracket 105. These brackets 103 and 105 are attached to the wall 25 within the chamber 36 in spaced relation and serve not only as conductors but also as resilient clamping means for the dry cells 104. Electrically coupled to the bracket 105 is one terminal of an electrical conductor 106, the opposite terminal of which is electrically coupled to one terminal each of a group of signal lamps 107, 108 and 109. The terminal of the signal lamp 107 opposite that which is coupled to the conductor 106 has connected thereto one end of a conductor 110, the opposite end of which is electrically connected to the arm 97 of the contact set 94. A conductor 111 has one end coupled to the terminal of the signal lamp 108 opposite that connected to the conductor 106, and the opposite terminal of the conductor 111 is coupled to the bracket 97 of the contact set 95. The terminal of the signal lamp 109 opposite that which is coupled to the conductor 106 is coupled through the medium of a conductor 112 which in turn is connected at its opposite end to the arm 97 of the contact set 96. It will thus be seen that when the rollers 100 and 101 of the respective groups of rollers 94, 95 and 96 are in contact with one another, the signal lamps 107, 108 and 109 will be illuminated. When however the strip of film F is moved downwardly by the feed rollers 70 the rollers 100 and 101 of the group 94 will first be separated, thereby extinguishing the signal light 107. As the film strip moves downwardly over the face of the focusing screen 48 it will encounter the rollers 100 and 101 of the group of rollers 95, thus forcing them apart and extinguishing the signal light 108. When the film moves downwardly completely to cover the focusing screen 48 the rollers of the group 96 will be separated and consequently the signal light 109 will be extinguished. In this way the position of the film relative to the focusing screen 48 may at all times be known to the operator so that inadvertent exposure of the film to light through the opening of the door 50 may be avoided.

Figure 11:
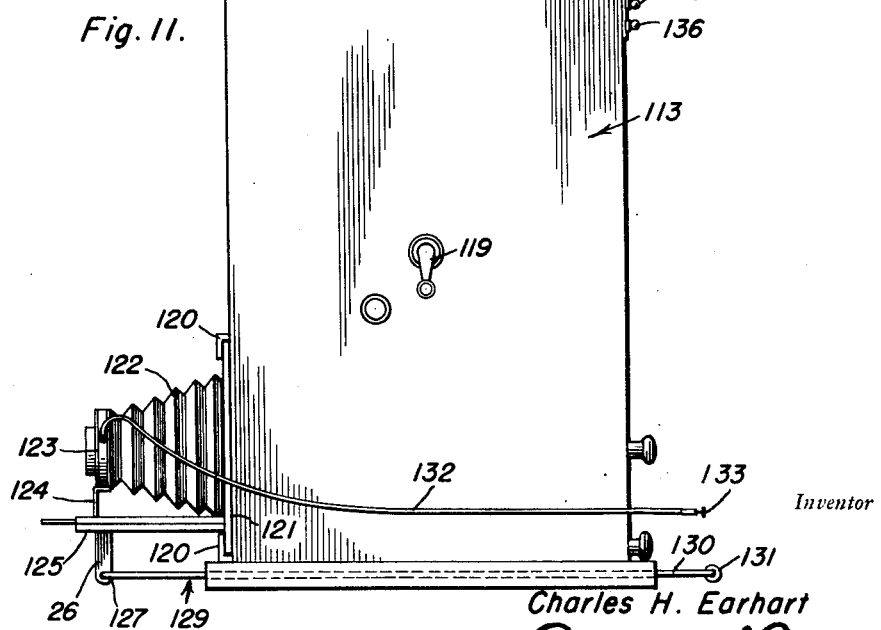
Figure 11 is a side view of the camera illustrated in Figure 9.
Figure 12:
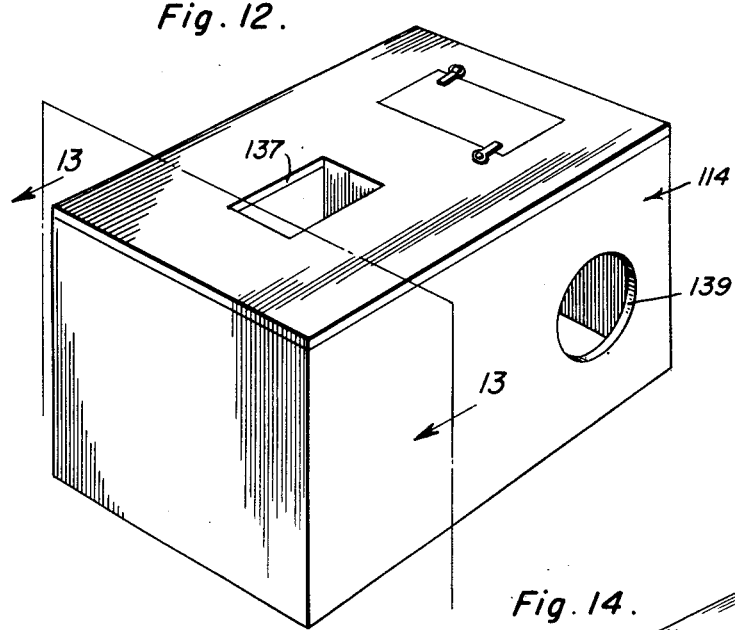
Figure 12 is a perspective view of a film developing box or dark room forming a feature of this invention.

In the modified form of the invention illustrated in Figures 10 and 11, the camera case is designated generally 113 and the front wall 115 of the camera case 113 is provided adjacent opposite side walls with exposure openings 116 and 117 respectively. The case is also divided vertically by a partition wall 118 and by horizontal partition walls corresponding in all respects to the partition walls 32 and 33 previously mentioned into adjacent upper magazine chambers, below which are located adjacent film feeding chambers, and at the lower end of the case into adjacent exposure chambers. The bottom end of the case is wholly open in order to fit over the top of the dark room or developing box to be more fully hereinafter described. The film advancing and feeding chambers house feed rolls corresponding in all respects to the feed rolls 70, and the feed rolls of one chamber are governed by a hand crank 119 which operates through one side wall of the case 113 while another hand crank operating through the opposite side wall of the case controls the feed rolls in the adjacent chamber. Mounted on the front wall 115 of the case above and below the openings 116 and 117 are horizontal guideways 120 in which a sliding panel 121 is received. This sliding panel is provided with a light admitting opening of a size to correspond to the size of the openings 116 and 117, and fitted in the light admitting opening of the panel is one end of a bellows 122 carrying at its forward end a lens mount 123 which is supported on a bracket 124 mounted to slide toward or away from the case 113 on a suitable support 125. Depending from the bracket 124 are spaced parallel arms 126 which are pierced as at 127 with aligning openings for the reception of the front cross bar 128 of an adjusting frame 129. This adjusting frame comprises in addition to the front cross bar 128 parallel side bars 130 which are slidably mounted through the case 113 near its lower end. The rear ends of the side bars 130 are joined by a rear cross bar 131 forming a handle by which the frame may be slid longitudinally in order to advance or retract the lens mount 123 with relation to the case 113. The lens mount 123 is equipped with a conventional shutter and carries a conventional shutter actuating mechanism such as a conventional Bowden wire 132 equipped with a conventional push button 133 by means of which the shutter may be actuated. By shifting the slide 121 so that the bellows 122 aligns with one or the other of the openings 116 and 117 in the case 113 it will be obvious that a picture may be taken on one or the other side of the camera case 113, and that by providing exposure areas of different sizes in the camera case, different size pictures may be produced. Each of the vertical compartments formed by the partition wall 118 is equipped with a set of signal lamps 134, 135 and 136 so that the operator may know the position of the film within the exposure chamber in the respective compartment.

The dark room or developing box employed in connection with the camera is designated generally 114 and comprises generally a box-like structure having a removable top wall with an opening 137 which when the developing or dark room is in position beneath the case 113 aligns with the slot through which the exposed film is fed, and thus exposed film will enter the developing box or dark room through the opening 137 to be deposited in a receptacle 138 having an open side. One side of the developing box or dark room is provided with an access opening 139 through which the operator may gain access to the interior, it being understood that this access opening 139 is surrounded by a conventional cloth sleeve or tubular member having an elastic band which fits around the arms of the operator to exclude light from the dark room during the development of the film. The wall on the side of the dark room opposite the access opening is provided with conventional windows having ruby glass closures which serve to permit the development process to be observed, without admitting the harmful light rays into the interior of the dark room.

Figure 14:
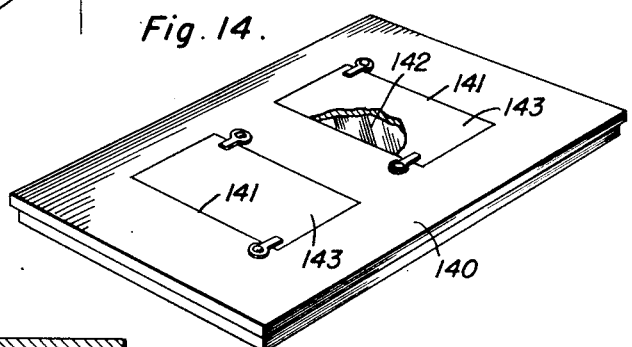
Figure 14 is a perspective view of a substitute cover for the developing box shown in Figure 11.
Figure 13:
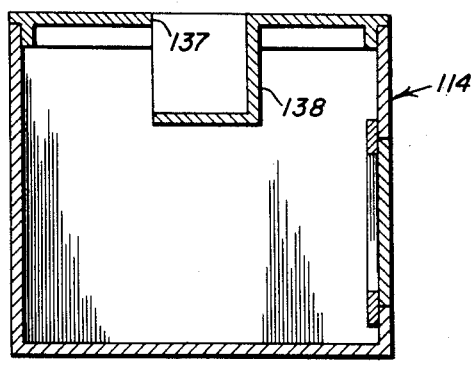
Figure 13 is a sectional view taken substantially along the line 13—13 of Figure 12.

In Figure 14 there is illustrated a top 140 which may be substituted for the removable top for the dark room or developing box 114, when the processing of the film is to be carried on without having a camera case joined to the box. This cover or top 140 is provided with window openings 141 which are permanently closed by ruby glass panes or panels 142. Suitable closures 143 may be removably supported in the windows openings 141 when so desired.

In use it will be understood that a film F is mounted in the magazine 56 and threaded downwardly through the slot 54 into contact with the rollers 70. By turning the rollers, the film may be fed downwardly over the face of the screen 48 and an exposure made. Obviously as the film passes over the face of the screen, the signal lights 107, 108, and 109 will successively be extinguished, thus indicating to the photographer or operator the position of the film on the screen. When it is desired to focus the camera, the film which has been moved downwardly over the face of the focusing screen 48 is moved upwardly by reversing the direction of rotation of the rollers 70 and the film may thus be retracted into the feeding chamber 36 so as to protect it against exposure to light when the door 50 is opened to enable the camera to be focused by observing the image on the screen 48. Obviously when the film has been wholly retracted into the chamber 36 all of the contact rollers 100 and 101 will be in contact so that all of the signal lamps 107, 108 and 109 will be illuminated. When the focusing of the camera has been completed, the door 50 is closed and the film again is fed downwardly across the face of the focusing screen. As the film moves downwardly the lamps 107, 108 and 109 will be extinguished in succession so that when the last lamp is out the photographer knows that the film is in a position to be exposed. Upon completion of the exposure, the exposed portion of the film is fed downwardly through the slot 46 beside the ledger blade 76' so that upon exerting pull on the handle 81 the movable blade 77 will cooperate with the ledger blade in severing the exposed film from the unexposed film. The exposed film thus severed will be deposited in the box 82 for transportation to a dark room for subsequent development, washing and fixing. When it is desired to make pictures of one half size, the mask 87 is moved downwardly into the position illustrated in Figure 7 and the film is advanced over the focusing screen 48 only to the point at which the lamp 108 is extinguished. Obviously the focusing of the camera when taking only half sized pictures proceeds as above described. The camera structure illustrated in Figures 10 through 13 will take four different sized pictures through the shifting of the panel 121 to bring the bellows 122 into alignment with one or the other openings 116 or 117 and employing a mask similar to that previously described before each focusing screen.

While in the foregoing there has been shown and described the preferred embodiment of this invention it is to be understood that minor changes in the details of construction, combination and arrangement of parts may be resorted to without departing from the spirit and scope of the invention as claimed.

Having described the invention, what is claimed as new is:

1. A quick processing camera for exposing a sensitized positive picture strip comprising a casing forming a light tight unit, divided into a series of superposed coextensive compartments by partition walls, each partition wall being provided with a transverse slot for the passage of said sensitized picture taking strip, leading into said adjacent compartment of the series, the slots of all compartment partition walls being aligned and arranged in the same plane, a picture strip storing case in one of said compartments, a film advancing means in the adjacent compartment of the series, a focusing screen in the compartment adjacent to the last mentioned compartment, containing the film advancing means, said focusing screen subdividing the compartment into two sections, one of said sections being a viewing section and the other a picture taking camera section, said focusing screen being arranged in a transverse plane closely adjacent to the plane passing through the slots in the compartment partition walls, the viewing section behind the focusing screen being provided with a viewing opening, closable by a door leading to the outside, and the said picture taking camera section being provided with a photographic lens and shutter, a series of contact devices arranged along and operated by the strip, a source of current and signal lamps on the outside, said signal lamps indicating the position of the strip, in the focal plane, a cutting device arranged in the vicinity of the slot leading from the last mentioned compartment containing the picture producing camera section and the focusing screen on the outside and a cut strip collecting compartment provided with an exposed cut strip collecting box, located below the slot.

2. A quick processing camera for exposing a sensitized positive picture strip, comprising a casing forming a light tight unit, subdivided into a series of adjacent superposed coextensive compartments by means of partition walls, each partition wall being provided with a transverse slot for the passage of the sensitized picture strip, and all slots being aligned and located substantially in the same plane, a strip storing case in one of said compartments, strip advancing rollers in the adjacent compartment, a focusing screen arranged in the next compartment adjacent to the last mentioned compartment, said focusing screen being arranged in a position close to the plane passing through the aligned slots, said screen dividing the compartment into a viewing section behind the focusing screen and in a picture taking camera section, the former section being provided with a viewing opening closable by a door leading to the outside of the light tight unit, the picture taking camera section being provided with a photographic lens and a shutter, a series of resiliently mounted contact roller pairs, the rollers of each pair being arranged on the two sides of the picture strip and normally in contact with each other, but being moved away from each other upon passage of a picture strip, a dry cell battery mounted in one of said compartments, a circuit connected with said battery for each of said pairs of rollers, and a signal light bulb in each of said circuits arranged on the outside of the unit, a cutting device arranged in the vicinity of the slot leading from the last mentioned compartment containing the picture producing camera section and the focusing screen on the outside and a cut strip collecting compartment provided with an exposed cut strip collecting box, located below the slot.

3. A quick processing camera for exposing a sensitized positive picture strip, comprising a casing forming a light tight unit, subdivided into a series of adjacent superposed coextensive compartments by means of partition walls, each partition wall being provided with a transverse slot for the passage of the sensitized picture strip, and all slots being aligned and located substantially in the same plane, a strip storing case in one of said compartments, strip advancing rollers in the adjacent compartment, a focusing screen arranged in the next compartment adjacent to the last mentioned compartment, said focusing screen being arranged in a position close to the plane pasisng through the aligned slots, said screen dividing the compartment into a viewing section behind the focusing screen and in a picture taking camera section, the former section being provided with a viewing opening closable by a door leading to the outside of the light tight unit, the picture taking camera section being provided with a photographic lens and a shutter, a mask rotatably held in said picture taking section, close to and in front of the plane passing through the slots, said mask having an opening uncovering a predetermined fraction of the exposed area, means for moving said mask from the outside to and from an uneffective position in substantial parallelism with one of the compartment walls and to and from a position in front of the picture strip, a series of resiliently mounted contact roller pairs, the rollers of each pair being arranged on the two sides of the picture strip and normally in contact with each other but being moved away from each other upon passage of a picture strip, a dry cell battery mounted in one of said compartments, a circuit connected with said battery for each of said pairs of rollers, and a signal light bulb in each of said circuits arranged on the outside of the unit, a cutting device arranged in the vicinity of the slot leading from the last mentioned compartment containing the picture producing camera section and the focusing screen on the outside and a cut strip collecting compartment provided with an exposed cut strip collecting box, located below the slot.

4. A quick processing camera for exposing a sensitized positive picture strip, comprising a casing forming a light tight unit, subdivided into a series of adjacent superposed coextensive compartments by means of partition walls, each partition wall being provided with a transverse slot for the passage of the sensitized picture strip, and all slots being aligned and located substantially in the same plane, a strip storing case in one of said compartments, strip advancing rollers in the adjacent compartment, a focusing screen arranged in the next compartment adjacent to the last mentioned compartment, said focusing screen being arranged in a position close to the plane passing through the aligned slots, said screen dividing the compartment into a viewing section behind the focusing screen and in a picture taking camera section, the former section being provided with a viewing opening closable by a door leading to the outside of the light tight unit, the picture taking camera section being provided with a photographic lens and a shutter, a movable slide carrying said photographic lens and shutter, a longitudinal partition wall dividing the unit into two sections longitudinally, the slide carrying the photographic lens and shutter being movable from the center of one longitudinal compartment to the center of the other longitudinal compartment, a mask rotatably mounted in each of said longitudinal sections in the picture taking camera section, held in close proximity to and in front of the plane passing through the picture strip slots, each of said masks having an opening uncovering a predetermined fraction of the exposed area, the area uncovered by the mask being different from the two masks in the two longitudinal sections, means operated from the one side of the unit for moving said masks from and into an effective position in front of and in substantial parallelism to the plane passing through the slots, and from and into a position in substantial parallelism with one of the first mentioned compartment walls, dividing the unit into superposed compartments, a cutting device arranged in the vicinity of the slot leading from the last mentioned compartment containing the picture producing camera section and the focusing screen on the outside and a cut strip collecting compartment provided with an exposed cut strip collecting box, located below the slot.

5. A quick processing camera for exposing a sensitized positive picture strip, comprising a casing forming a light tight unit subdivided into a series of aligned coextensive compartments by means of parallel partition walls, each provided with a transversely arranged slot, all slots being aligned and located substantially in the same plane for the consecutive passage of the strip through them, the first of these compartments being a magazine compartment, a second compartment being a strip advancing compartment, a third compartment being a focussing compartment, and a fourth compartment being an exposed cut strip collecting compartment, the said first compartment containing a strip supply storing case, holding a strip supply roller, the third compartment being transversely divided by a fixed focussing screen, arranged with its surface in the plane passing through the aligned slots, into a viewing section with a viewing opening, closable by a viewing door leading to the outside of the light tight unit and into a picture taking camera section, provided with a lens and a shutter, the focal plane of the camera being coincident with the plane of alignment of the slots, lateral strip guiding means, within the focussing compartment substantially in the plane passing through the aligned slots, strip advancing rollers and a cutting device arranged on opposite sides of the said focussing compartment, the strip advancing rollers being arranged in the second compartment between the exit ends of the slots in the partition wall leading from said magazine compartment into said strip advancing compartment and the entrance ends of the slots leading from the latter compartment into said focussing compartment, said strip advancing rollers being provided with means operable from the outside of the light tight unit by manual operation, and the said cutting device being arranged in the immediate vicinity of the partition wall and of the exit end of the slot leading from the focussing compartment to the exposed cut strip collecting compartment and within the latter, the cut strip collecting compartment containing an exposed cut strip collecting box provided with a slidable cover, the latter being further provided with manipulating means projecting to the outside for opening and closing said strip collecting box, this arrangement thus permitting a strip advance in the focal plane over the fixed focussing screen, and also permitting a further advance of the exposed strip past the cutting device into the exposed film collecting box and further permitting a retraction of the strip from the focussing screen for focussing purposes.

6. A quick processing camera for exposing a sensitized positive picture strip, comprising a casing forming a light tight unit subdivided into a series of aligned coextensive compartments by means of parallel partition walls, each provided with a transversely arranged slot and all slots being aligned and located substantially in the same plane for the consecutive passage of the strip through them, the first of these compartments being a magazine compartment, a second compartment being a strip advancing compartment, a third compartment being a focussing compartment and a fourth compartment being an exposed strip collecting compartment, the said first compartment containing a strip supply storing case holding a strip supply roller, the partition wall separating said first compartment from the immediately adjacent strip advancing compartment being subdivided and having an opening closed by a closure plate provided with the slot for the passage of the picture strip, frames carried by said closure plate, projecting into said strip advancing compartment, said frames being adjustable longitudinally with respect to the plane along which the slots are aligned, transverse axles parallel to the slots carried by said frames, strip advancing friction rollers for contacting said sensitized picture taking strip mounted on the said axles, spring tensioned means connected with one of the frames for regulating the pressure of the friction rollers on the sensitized picture taking strip, one of the friction rollers carrying axles projecting to the outside of the light tight unit and being provided with means for manual operation, lateral guiding blocks provided with slots for the longitudinal guiding of the picture strip in said compartment, a fixed focussing screen in the third compartment adjacent to the strip advancing compartment arranged with its surface in a plane passing through the aligned slots, said focussing screen dividing the said third compartment into viewing section with a viewing opening closable by a door leading to the outside of the light tight unit and into a picture taking camera section provided with a lens and a shutter, the focal plane of the camera being coincident with the plane of alignment of the slots, spaced longitudinally arranged lateral guides each provided with a guiding slot on each side of the focussing compartment, the guiding slots being substantially aligned with the surface of the focussing screen, a cutting device arranged on the side of the focussing compartment, opposed to the side on which the strip advancing compartment is arranged, said cutting device being located within the exposed cut strip collecting compartment in the immediate vicinity of the exit end of the slot leading from the focussing compartment through the partition wall to the last named compartment, an exposed cut strip collecting box, provided with a slidable cover and a manipulating lever, projecting to the outside of the light tight unit for opening and closing said box in said exposed cut strip compartment, this arrangement thus permitting a strip advance in the focal plane over the fixed focussing screen, a further advance of the exposed strip past the cutting device into the collecting box, and a retraction of the strip from the focussing screen for focussing purposes.

CHARLES H. EARHART.

REFERENCES CITED

The following references are of record in the file of this patent:

UNITED STATES PATENTS

| Number | Name | Date |
|---|---|---|
| 367,013 | Senat | July 17, 1887 |
| 1,032,867 | Steadman | July 16, 1912 |
| 1,040,976 | Coqueugneot | Oct. 8, 1912 |
| 1,341,543 | Cardwell | May 25, 1920 |
| 1,841,811 | Hershberg | Jan. 19, 1932 |
| 1,859,258 | Beidler | May 17, 1932 |
| 2,245,606 | Rauch | June 17, 1941 |
| 2,256,981 | Klein | Sept. 23, 1941 |
| 2,282,427 | Powers | May 12, 1942 |
| 2,373,536 | Burbridge | Apr. 10, 1945 |
| 2,403,717 | Harvey | July 9, 1946 |
| 2,430,687 | Sabel | Nov. 11, 1947 |

FOREIGN PATENTS

| Number | Country | Date |
|---|---|---|
| 21,190 | Australia | July 12, 1929 |